United States Patent [19]

Menezes et al.

[11] Patent Number: 4,601,960
[45] Date of Patent: Jul. 22, 1986

[54] PHOTOELECTROCHEMICAL SOLAR CELL AND METHOD OF FABRICATING A SUBSTRATE FOR SUCH A CELL

[75] Inventors: Shalini Menezes, Califon, N.J.; Hans-Joachim Lewerenz, Berlin, Fed. Rep. of Germany; Klaus Bachmann, Raleigh, N.C.

[73] Assignee: Hahn-Meitner-Institut für Kernforschung Berlin GmbH, Fed. Rep. of Germany

[21] Appl. No.: 637,758

[22] Filed: Aug. 6, 1984

[30] Foreign Application Priority Data

Aug. 24, 1983 [DE] Fed. Rep. of Germany ....... 3330902
Dec. 22, 1983 [DE] Fed. Rep. of Germany ....... 3347129

[51] Int. Cl.$^4$ ............................................. H01M 6/36
[52] U.S. Cl. ................................. 429/111; 204/34.5; 204/37.6
[58] Field of Search ................ 429/111; 136/260, 264, 136/265; 204/34.5, 37.6, 140

[56] References Cited

U.S. PATENT DOCUMENTS 4,180,625 12/1979 Wagner ................................. 429/111
4,386,142  5/1983 Hodes et al. ....................... 429/111
4,388,382  6/1983 Bachmann et al. ................. 429/111

OTHER PUBLICATIONS

L. F. Schneemeyer et al, *J. Electrochem. Soc.*, vol. 129, pp. 1977-1981 (1982).
B. A. Parkinson et al, *Appl. Phys. Lett.*, vol. 33, pp. 521-523 (1978).
C. M. Gronet et al, *Nature*, vol. 30, pp. 733-735 (1982).
A. Heller et al, *J. Am. Chem. Soc.*, vol. 102, pp. 6555-6556 (1980).
*J. Electrochem. Soc.*, vol. 130, Reviews & News, Nos. 235-237, pp. 87C-88C (1983).
S. Menezes et al, *Nature*, vol. 305, pp. 615-616 (1983).

*Primary Examiner*—Aaron Weisstuch
*Attorney, Agent, or Firm*—McGlew and Tuttle

[57] ABSTRACT

To obtain an efficiency of about 10% in photoelectrochemical solar cells, the pairing of semiconductor material for the working electrode and composition of the electrolyte liquid is of critical importance. The semiconductor material therefore should not be too expensive, and should have a short absorption length for light and be resistant to photocorrosion. Further, a non-toxic electrolyte should be employed permitting operation even without a hermetic seal. The photoelectrochemical solar cell of the invention utilizes a $CuInSe_2$ or $CuInS_2$ in a ternary compound, for the semiconductor material, which is used with an iodine-iodide solution as an electrolyte. In a method of fabricating a substrate for such a cell, a surface film is produced on a single-crystal or polycrystalline semiconductor material, particularly $CuInSe_2$, by immersing the semiconductor material after an etching and rinsing process into the electrolyte solution and simultaneously exposing it to light and polarizing it cyclically between two potential limits. Upon repeating this procedure several times, the material is exposed to light at the operating point for a longer time. The film thereby produced yields a p-n junction at the boundary layer. The advantage is a very high potential for an efficient solar energy conversion and the growth of the heterostructure can be controlled.

16 Claims, 7 Drawing Figures

4,601,960

PHOTOELECTROCHEMICAL SOLAR CELL AND METHOD OF FABRICATING A SUBSTRATE FOR SUCH A CELL

FIELD AND BACKGROUND OF THE INVENTION

The present invention relates, in general, to photoelectric cells, and in particular to a new and useful photoelectrochemical cell of the type which has an efficiency of about 10%, but utilizing as a semiconductor material a ternary compound of the material system $CuInSe_2$ or $CuInS_2$, which acts as the working electrode, and an iodine-iodide solution.

Photoelectrochemical solar cells have an advantage over photovoltaic systems in that providing a contacting connection is much simpler. The transition from solid to liquid raises no problems for the electric connection, nor does it lead to undesirable mechanical stresses between materials having different crystal structures. What is troublesome, however, is the photocorrosion of the semiconductor. This is a process which is concurrent with the regenerative operation of the cell and one which unfavorably affects the stability of the photoelectrochemical solar cell.

In prior art photoelectrochemical solar cells systems having an efficiency of about 10% and intended to convert solar energy inexpensively, the starting material of the semiconductor is frequently expensive. In addition, mostly electrolyte solutions are employed which are toxic, and the cells must be hermetically enclosed to prevent the solution from decomposition. As to disclosure of such systems, see for example: "Enhanced Photoelectrochemical Solar-Energy Conversion by Gallium Arsenide Surface Modification" by Parkinson et al which shows n-GaAs in an aqueous selenide-polyselenide solution (*Appl. Phys. Lett.* 33(6), Sept. 15, 1978, p. 521); "Design of a 13% Efficient . . . Cell" by Gronet et al, that shows $n-GaAs_{1-x}P_x$ in an organic electrolyte (Nature, Vol. 300, Dec. 23 and 30, 1982, p. 733); and "An Efficient Photocathode for . . . Cells" by Miller et al which shows p-InP in a strongly acid solution of vanadium-hydrochloric acid (*Journal of the American Chemical Soc.*, Vol. 102 p. 6555, (1980)).

Recent developments in semiconductor materials having small absorption lengths for the solar spectrum radiation may be learned from: *J. Electrochem. Soc.*, March 1983, Reviews and News Nos. 235 to 237, pages 87C–88C. Attention is drawn to $CuInSe_2$ in this publication, and a wide range of possible applications which is indicated in No. 237, including photovoltaic systems of $CuInSe_2/CdS$ for solar cells.

SUMMARY OF THE INVENTION

Starting from this prior art, the invention is directed to a photoelectrochemical solar cell in which the semiconductor material and the electrolyte composition are suitably matched to each other to obtain an efficiency known in prior art photoelectrochemical solar cells, yet the starting material for the semiconductor working electrode has a shorter absorption length and is not only less expensive than GaAs or InP, for example, but also more resistant to photocorrosion, and the electrolyte is not toxic, thus permitting an operation without hermetic enclosure.

Accordingly, an object of the present invention is to utilize $CuInSe_2$ or $CuInS_2$, including the homogeneity regions and in situ produced surface modifications of these compounds, for the working electrode, and an iodine-iodide solution, preferably with a stabilizer selection from transition metal halogenides, for the electrolyte solution.

With this solid-liquid combination, advantages in economy take effect since the price of the semiconductor material is relatively low and its absorption length is small which means that only a small thickness of the semiconductor film is needed. The invention has further the substantial operational advantage of providing a stable pairing of this semiconductor material with a non-toxic electrolyte solution, resulting in an efficient photoelectrochemical solar cell.

The working electrode of the inventive cell is advantageously made of a single-crystal or polycrystalline semiconductor material. With an amorphous material, which of course would be still less expensive, the desired efficiency cannot be obtained. In laboratory tests, an unpolished single-crystal $n-CuInSe_2$, has proved excellently suitable, for example.

To build up the contact of the working electrode which is to be secured to a holding member in a position so as to have light incidence, as far as possible, perpendicular to the semiconductor plate, the following procedure may be provided:

On the back side of the semiconductor substrate, a layer of Hg-In-amalgam and thereon a layer of Ag-plastic is deposited. A connecting wire is secured to the Ag plastic layer. The side surfaces and rear side of the contacted semiconductor substrate may then be coated with an insulating compound which must also be corrosion resistant. The connecting wire, for example of copper, can be brought out of the cell in various ways and must also be insulated and corrosion resistant. The Ag plastic may be an epoxy mass type 100, available for example from the 3M Company, and commercial silicone rubber may be employed as the corrosion resistant, electrically insulating coating. Prior to immersing it into the electrolyte solution, a completely contacted working electrode entirely coated with silicone rubber, except for a window to be left uncovered, should be etched with aqua regia (three parts of HCl and one part of $HNO_3$) several times for five seconds, thereupon rinsed with deionized water, and then immersed for 20 seconds into 0.2M KCN and again rinsed.

As already mentioned above, an inventive cell may be embodied so as to be operable even without a hermetic enclosure. In such an instance, the non-toxicity of the electrolyte solution becomes a substantial feature of the invention, protecting the outside of the cell from harmful chemical effects. The electrolyte, of course, must comply with the inventive solid-liquid matching of electrode material with the electrolyte composition and also ensure a resistance to photocorrosion. These requirements are fully met by an electrolyte solution containing 2.5M HI, 1M $CaI_2$, 60 mM $I_2$ and 20 mM CuI in $H_2O$. This composition has proved particularly suitable. Electrolytes having another composition, as to both molar proportion and constituents, particularly the transition metal halogenide forming the stabilizer, and which might better comply with modified requirements, are thereby not excluded and remain covered by the scope of the invention.

To fabricate a substrate for a solar cell, a single-crystal chalcopyrite semiconductor material, particularly $CuInSe_2$, or a polycrystalline material, is etched several times, particularly with aqua regia, and then rinsed, particularly with deionized water. Due to the repeated etching and rinsing, a film forms on the working surface of the substrate. This film, however, has no optimum properties as to the photoactivity of the structure comprising the substrate and the film formed thereon. Further, this structure is suitable only for being used in a photoelectrochemical solar cell.

To improve the photoconductivity of this semiconductor/film structure and make the substrate usable as a photoelectrochemical solar cell, a photovoltaic solar cell, or as a diode, the substrate is immersed into an electrolyte solution and simultaneously exposed to light. The electrolyte solution is composed of 2.5M HI, 1M CaI$_2$, 60 mM I$_2$ and at least 15 mM Cu+. During the illumination, the substrate in the electrolyte solution is cyclically polarized between two potential limits. Upon a multiple repetition of this procedure, the substrate is then exposed to light for a longer time at its operating point. In accordance with the invention, a film is formed on the substrate surface in a controlled manner. After each etching, the film is partly etched away, and formed again during each polarization and illumination cycle, thus resulting in a heterostructure. The etching and electrolyte dipping cycles pretreat the surface of the substrate in a way such that upon exposing it to light at a fixed potential, a controlled growth of a film is ensured. Thereby, a pn junction is formed in an electrochemical way. The fill factor of the structure considerably exceeds that of prior art structures. Further, the inventive structure may be employed both as a photoelectrochemical solar cell in an electrolyte, and as a photovoltaic solar cell, and finally even as a diode.

According to a development of the invention, it is particularly advantageous to subsequently temper the substrate in air.

Accordingly, an object of the invention is to provide a photoelectric chemical solar cell and method of making the same wherein the cell is simple in design, rugged in construction and economical to manufacture.

For an understanding of the principles of the invention, reference is made to the following description of typical embodiments thereof as illustrated in the accompanying drawings.

FIELD AND BACKGROUND OF THE INVENTION

In the following, several embodiments of an inventive cell and the method of fabricating a substrate therefor are explained in more detail. Details important to the invention are shown in the drawings in which.

DESCRIPTION OF THE PREFERRED EMBODIMENTS

Figure 1:
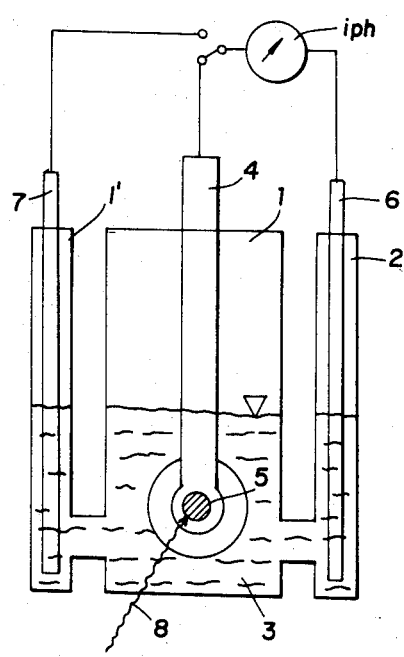
FIG. 1 illustrates the construction and the operating elements of a photoelectrochemical solar cell.

The photoelectrochemical solar cell (PECS) shown in FIG. 1 comprises a chamber 1 accommodating a working electrode 4, a secondary chamber 1' with a reference electrode 7 for scientific investigation of the conversion and not necessary for the function proper of the cell, namely of converting solar energy into electrical energy, and a chamber 2 accommodating a counterelectrode 6. Counterelectrode 6 and reference electrode 7 are made from a carbon rod, for example. Chambers 1, 1', 2 contain an electrolyte solution 3 by which electrodes 4, 6, 7 are at least partly wetted. On the wet end of working electrode 4, a semiconductor substrate 5 in the form of a small plate is mounted, which is exposed to a luminous flux 8.

Upon illuminating n-CuInSe$_2$ (copper indium diselenide), namely the substrate 5, immersed in an electrolyte solution 3, which is for example a I$^-$/I$_3^-$—HI—Cu+ solution, positive h+ at electrode 4 oxidize I$^-$ to the end product I$_3^-$. At counterelectrode 6, I$_3^-$ is reduced to I$^-$. In the outer circuit of this regenerative cell then flows the photocurrent i$_{ph}$.

Figure 2:
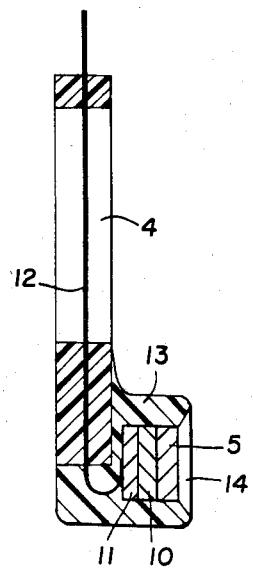
FIG. 2 shows the structure of a working electrode, in a first embodiment with contacting elements and a connecting wire.

FIG. 2 shows a construction of a working electrode 4 with the contacted substrate 5 in a sectional view. Provided between the back side of substrate 5 and the connecting wire 12 are a layer 10 of Hg-In amalgam and a layer 11 of (conductive) Ag plastic. Connecting wire 12 is secured to, or in, plastic layer 11 and brought out in an electrically insulated and corrosion-safe manner. The completely contacted semiconductor substrate 5 is also enclosed in an electrically insulating and corrosion-safe manner and encapsulated by a suitable substance 13, such as epoxy resin, glass, or silicone rubber. The surface of substrate 5 must come into direct contact with the liquid electrolyte; therefore, a window 14 must be left during the encapsulation, fusing in, etc., with substance 13.

Figure 3:
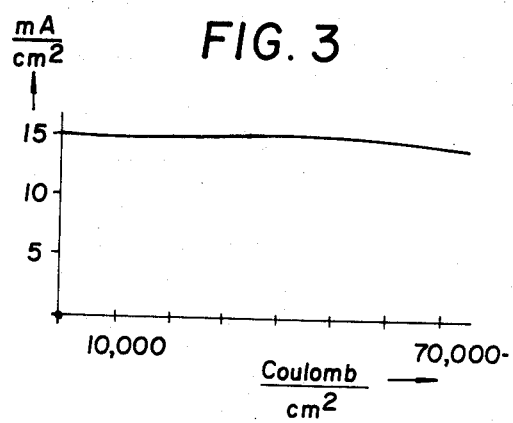
FIG. 3 is a graph of the photocurrent density in mA/cm$^2$, plotted against the converted charge in Coulomb/cm$^2$, in a cell according to FIG. 2.

FIG. 3 shows the result of a stability and output measurement. The measurement has been made in potentiostatic arrangement with a combination of a n-CuInSe$_2$ with 2.5M HI, 1M CaI$_2$, 60 mM I$_2$ and 20 mM CuCl. Counterelectrode 6 and reference electrode 7 were carbon rods (of spectral quality). For illumination, white light of a tungsteniodine lamp was used. As may be learned from FIG. 3, substantially no variation occurred in the photocurrent (mA/cm$^2$) over 70,000 C/cm$^2$.

Figure 4:
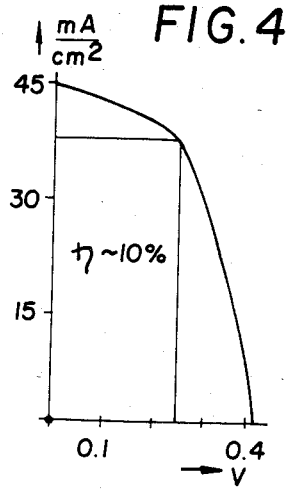
FIG. 4 shows the current-voltage curve, in mA/cm$^2$ over volts, of a cell according to FIG. 2.

Measurements of the efficiency of a photoelectrochemical solar cell were performed with an Oriel Corp. solar light simulator and the result is shown in in FIG. 4. The simulator is equipped with a 1,000 W ultraviolet lamp permitting insertion of filters simulating the respective desired spectral composition of the light, AM 0, AM 1, AM 2. The measurement was made under AM 1 conditions at a 101 mW/cm$^2$ light intensity. The maximum operating point of the solar cell is at about 38 mA/cm$^2$, the voltage at this point is 0.25 volt. Therefrom, the efficiency $$\eta = \frac{38 \ mA/cm^2 \cdot 0.25 \ V}{101 \ mW/cm^2} = 9.4\%$$

In a non-prior art article by the present inventors with the title: "Efficient and Stable Solar Cell by Interfacial Film Formation" the interface of n-CuInSe$_2$-

/I⁻—I₂—Cu⁺HI/C is disclosed. This article was published in the periodical Nature, Vol. 305, 13 Oct. 1983 pp 615-616 and was also disclosed in a presentation at the 34th ISE Meeting, in Erlangen, Germany (September 1983).

Figure 5:
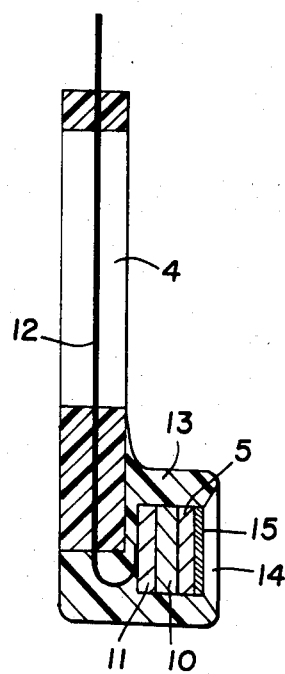
FIG. 5 is a view similar to FIG. 2, showing a second embodiment of the contact elements and the connecting wire.

In the second embodiment shown in FIG. 5, (where like numbers designate like parts), the construction of the working electrode is to a large extent similar to that according to FIG. 2. A single-crystal of copper-indium selenide ($CuInSe_2$) is used as the starting material for substrate 5. Therefrom, the thin plate 5 having a thickness of about 0.5 mm is sawed off and inserted in working electrode 4 as shown in the figure.

The thus embedded plate 5 is etched with aqua regia having a proportion of two parts of HCl and one part of $HNO_3$. This is followed by rinsing in deionized water and again etching with 10% KCN (potassim cyanide), whereupon a new rinsing with deionized water is provided.

Thereupon, working electrode 4 is immersed into electrolyte solution 3 as shown in FIG. 1, which is a $I^-/I_3^-$—HI—CU⁺ solution (redox electrolyte), for example. Then the contact with reference electrode 7 is closed, to set exactly defined voltages, for example between 0 and the photopotential of 0.42 volts. A cyclic polarization of the substrate 5 is then effected by alternating the mentioned two potentials. At the same time substrate 5 is illuminated with a light beam 8 produced by a tungsten—iodine lamp (quartz-halogen lamp). This makes the film 15 on the surface of substrate 5, grow.

Working electrode 4 is then withdrawn again from electrolyte solution 3, rinsed with deionized water and etched as described above, which is again followed by a cyclic polarizing in redox electrolyte 3. This procedure is repeated several times. Film 15 forms continuously at every repetition, but is also partly etched away at every repetition, so that a new film is formed recurrently. Thereupon, working electrode 4 in the redox electrolyte is illuminated for several hours at an applied voltage near the operating point (about 0.25 volts), which finishes the formation of film 15. It has been found particularly advantageous to temper working electrode 4 in air for a short time, e.g. 15 minutes at about 150° C. after its withdrawal from the redox electrolyte and rinsing it as well as drying it with $N_2$. This distinctly improves the parameters of the cell, particularly the fill factor.

Figure 6:
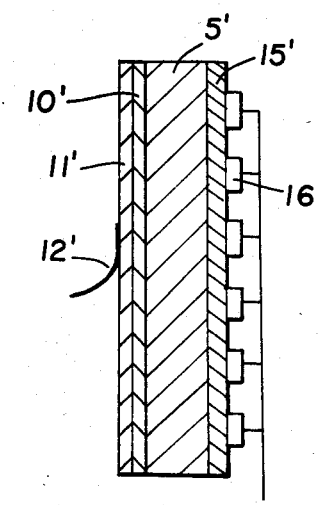
FIG. 6 shows a third embodiment, namely the design of a working electrode for a photovoltaic solar cell.

FIG. 6 shows a photovoltaic solar cell comprising an n-$CuInSe_2$ semiconductor substrate 5' which, in the same manner as in the photoelectrochemical cell according to FIG. 5, is provided on its backside with a layer 10' of Hg-In amalgam and a layer 11' of Ag plastic, to which a copper wire 12' is secured. The front contact 16 is produced by vapor-depositing a lattice of a metal having a high work function, such as Au on a p-type film 15'.

It is thus made possible to convert solar energy (light beam 8) into electric energy by means of a heterostructure (p-n junction) formed between two different semiconductor materials, namely n-$CuInSe_2$ and the p-type film 15', while employing a I-III-VI₂—chalcopyrite semiconductor as the substrate. Film 15' formed on this substrate develops the p-n junction. The advantage is the very high potential of the starting n-$CuInSe_2$ material for an efficient conversion of solar energy, as well as the possibility of electrochemically controlling the growth of the heterostructure.

In the following the basic properties of solar cells of the embodiments of FIGS. 5 and 6 are explained.

The inventive method of forming a heterostructure by photoelectrochemical surface transformation of semiconductors is based on the growth of a new semiconductor phase 15 at the n-$CuInSe_2$/$I^-$—$I_3^-$—Cu⁺ interface, and is carried out by adjusting electrochemical parameters in a controlled way. The new phase or layer 15 can be identified as a $CuSe_3$ film of p-type conduction. Under illumination, the layer 15 permits a satisfactory charge transfer between $CuInSe_2$ and the $I^-/I_3^-$ redox combination, and at the same time prevents the semiconductor (n-$CuInSe_2$) from dissolving.

The recent interest in $CuInSe_2$ is due to the excellent optoelectronic properties of the substance which have led to the development of efficient solid-state solar cells and photoelectro-chemical solar cells. The behavior of photoelectrochemical solar cells depends on the growth of the film which is obtained by suitably selecting the composition of the electrolyte.

The films were produced on etched (112) surfaces of n-$CuInSe_2$ substrates connected as photoanodes, and in an electrolyte consisting of IM $I^-$, 0.05M $I_2$, 0.02M CuI and 2M HI. Examination of these surfaces in a scanning electron microscope (SEM), shows that a polycrystalline film has grown composed of disordered, flat, hexagonal crystallites. The size of the crystallites ranges between 2 and 5 microns. The unambiguous crystal geometry suggests that a chemically definite compound has been produced at the interface between the $CuInSe_2$ and the electrolyte. Through x-ray diffraction under glancing incidence, the crystallites of the new phase are identified as $CuSe_3$ and elementary selenium (Se). No indication of a formation of polycrystalline copper iodide (CuI) has been found. The satisfactory agreement between the relative maxima of the film and determined powder diffraction data excludes a preferred orientation in the surface layer.

A differential measurement of the capacitance of the structure shows a linear Mott-Schottky behavior in the region of about 0.3 volts and permits extrapolation of the flat band potential $V_{FB}$. The obtained value of $V_{FB}=0.28$ volts, measured relative to the reference electrode (saturated calomel electrode) is independent of the modulation frequency.

An observation made of the surface of a nontreated $CuInSe_2$ single crystal through ultraviolet photoelectron spectroscopy (UPS) is compared with the data determined from the heterostructure. The position of the Fermi level and of the valence band edges is derived from the energy distribution curves N(E). The energy scales are shifted relative to each other by the work function difference, to obtain a common relation to the vacuum level. The edge of valence band $E_{VB}$ appears at the same energy value in both samples, while the Fermi levels $E_F^j$ differ by 0.65 eV. The obtained values are $|E_F^j - E_{VB}^n| = 0.85$ eV for $CuInSe_2$, and $E_F^p - E_{VB}^p = 0.2$ eV for $CuSe_3$—Se°. With a band gap $E_G = 2$ eV, the $CuSe_3$—Se° film is identified as a p-type semiconductor. Consequently, the photoactive contact is located at the interface between n-$CuInSe_2$ and p-$CuSe_3$—Se°. The photovoltage $V_{photo}$ of 0.42 V formed at the electrochemical n-$CuInSe_2$-/$I^-$—$I_2$—Cu⁺—HI/C solar cell shows that the contact potential drops at the p-n junction.

Figure 7:
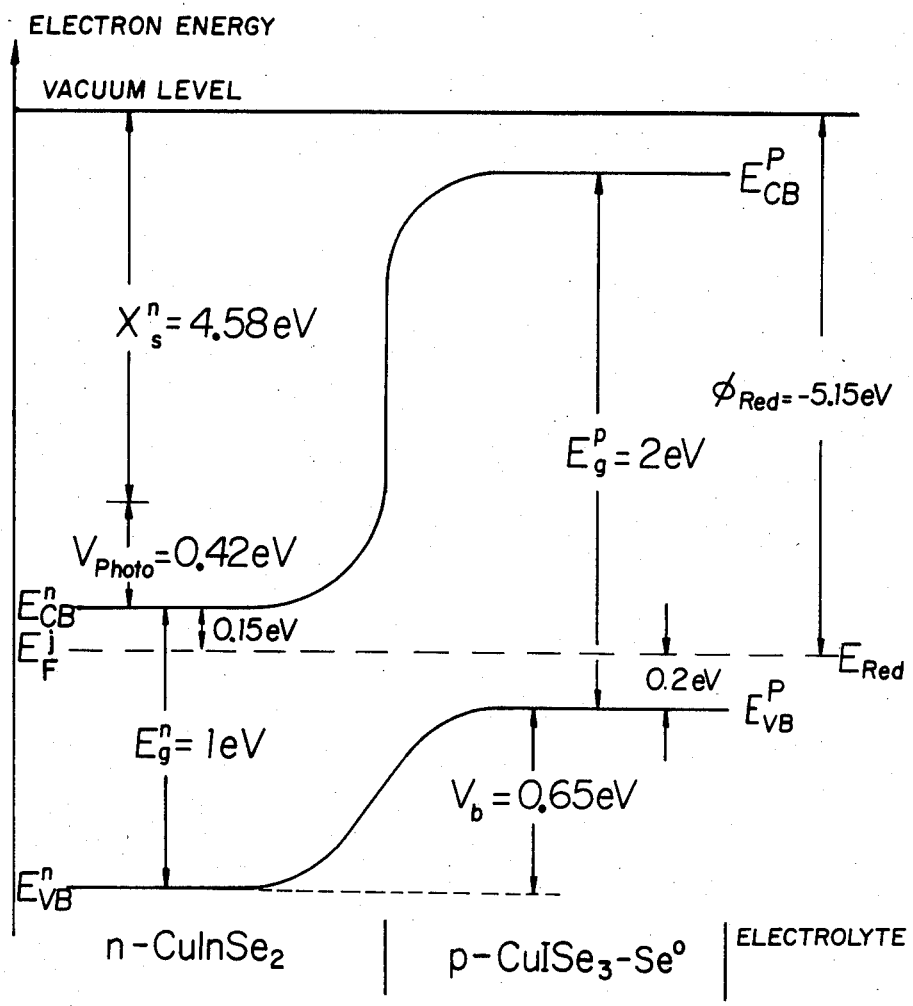
FIG. 7 is an energy-band diagram of the pn junction in a solar cell according to FIGS. 5 and 6.

FIG. 7 is an energy band diagram of the contact junction between n-$CuInSe_2$ and p-$CuSe_3$—Se°. The electron affinity of $CuInSe_2$, $X_s^n = 4.58$ eV, the measured photovoltage $V_{photo}$ of 0.42 V, and the spacing of the conduction band from the Fermi level $E_{CB}{}^n - E_F{}^j = E_G{}^n - |E_F{}^j - E_{VB}{}^n| = 0.15$ eV determine the position of the Fermi level of the p-n junction at $\phi = -5.15$ eV. The redox potential of $E_{Red} = +0.2$ (SCE) corresponds to a work function of the redox combination of $\phi_{Red} = -5.15$ eV, with an assumed work function of the standard hydrogen electrode (NHE) being $-4.7$ eV. The agreement between $\phi_j$ and $\phi_{Red}$ indicates the existence of an ohmic contact at the interface between the heterostructure and the electrolyte. The value of the flat band potential $V_{FB} = -0.28$ V (SCE) corresponds approximately to 0 V (NHE), i.e. $E_F{}^j = -4.73$ eV. Upon adding $X_X{}^n = 4.58$ eV and $E_{CB}{}^n - E_F{}^j = 0.15$ eV, the result is $E_F{}^{j'} = -4.73$ eV. This means that the agreement between the electrochemical and the surface analysis is very satisfactory.

Considering the charge carrier concentration in the $CuSe_3-Se°$, which, at the present time, is not yet determined, it is expected that the initial contact potential exceeds 0.65 eV, since this amount has been obtained by comparing the $CuInSe_2$ sample with the already formed $CuInSe_2$+film contact.

Chemical reactions of the illuminated $CuInSe_2$ with the constituents of the electrolyte convert the surface of the semiconductor and form the p-n junction. In the absence of $Cu^+$, CuI and elementary selenium (Se) have been found on the photocorroded $CuInSe_2$ surfaces. CuI is partly soluble in iodide solutions and forms $CuI_2{}^-$. While adding $Cu^+$ to the solution, the surface concentration of $CuI_2{}^-$ rises to a critical value which is necessary for initiating the growth of the $CuSe_2$ film. The reactants CuI, HI, and Se, which are used in the hydrothermal synthesis of $CuSe_3$, are thus supplied by the electrolyte and the components of the semiconductor, while the reaction enthalpy is delivered through the photopotential.

The invention is thus a photoelectrochemical solar cell having an efficiency of about 10% for converting light energy into electric energy which comprises a container 1, a liquid electrolyte 3 in the container which is formed of an iodine-iodide solution, and a semiconductor electrode 5, in the container and in contact with the electrolyte, which semiconductor electrode is made of a ternary compound of the material system $CuInSe_2$ or $CuInS_2$, inclusive of the homogeneity regions and in sutu produced surface modifications thereof.

The invention also includes a method of fabricating a substrate for such a semi-conductor electrode wherein a single crystal chalcopyrite semiconductor material, and in particular $CuInSe_2$ or a polycrystalline material is repeatedly etched, in particularly by aqua regia, and then rinsed, in particular with deionized water, and that after every etching and rinsing process, the substrate is immersed in an electrolyte solution and simultaneously illuminated for cyclically polarizing the substrate during its illumination between two potential limits, and then, after repeating the foregoing steps several times, the substrate is illuminated for a longer time at its operating point.

While specific embodiments of the invention have been shown and described in detail to illustrate the application of the principles of the invention, it will be understood that the invention may be embodied otherwise without departing from such principles.

What is claimed is:

1. A photoelectrochemical solar cell having an efficiency of about 10% for converting light energy into electric energy, comprising:
   a container;
   a liquid electrolyte in said container comprising an iodine-iodide solution, plus at least some $Cu^+$ ions; and
   a working electrode in said container and in contact with said electrolyte, said working electrode comprising a semiconductor ternary semiconductor compound selected from one of the material systems of $CuInSe_2$ and $CuInS_2$, inclusive of in situ produced surface modifications thereof.

2. A solar cell according to claim 1, wherein said liquid electrolyte includes a stabilizer formed of a transition metal halogenide.

3. A solar cell according to claim 2, wherein said working electrode comprises a single crystal.

4. A solar cell according to claim 2, wherein said working electrode is polycrystalline in form.

5. A solar cell according to claim 1, wherein said working electrode includes a contacting connection formed of Hg-In amalgam, and an Ag plastic overlying said amalgam forming a site for connection of a wire to said working electrode.

6. A solar cell according to claim 1, wherein said liquid electrolyte comprises an aqueous electrolyte solution containing 2.5M HI, 1M $CaI_2$, 60 mM $I_2$, and at least 15 mM $Cu^+$.

7. A method of fabricating the working electrode of a photoelectrochemical solar cell which has an efficiency of about 10% for converting light energy into electrical energy, comprising the steps of:
   (a) providing a substrate $CuInSe_2$;
   (b) etching the substrate;
   (c) rinsing the substrate;
   (d) repeating steps (b) and (c) at least once;
   (e) immersing the etched substrate in an electrolyte;
   (f) cyclically polarizing the etched substrate by applying a potential between two potential limits to the substrate;
   (g) during step (f), illuminating the substrate to grow a film on an illuminated surface of the substrate;
   (h) removing the substrate from the electrolyte;
   (i) rinsing the substrate after it has been removed from the electrolyte;
   (j) repeating steps (d) through (i) a plurality of times;
   (k) re-immersing the substrate in said electrolyte; and
   (l) illuminating the re-immersed substrate while applying a voltage to the re-immersed substrate near an operating point thereof intermediate the potential limits.

8. A method according to claim 7, wherein the electrolyte comprises an iodine-iodide solution plus at least some $Cu^+$ ions.

9. A method according to claim 8, wherein the potential limits are from 0.0 to 0.42 volts.

10. A method according to claim 9, wherein the operating point is about 0.25 volts.

11. A method according to claim 10, wherein the period of illumination in step (l) is several hours.

12. A method according to claim 8, including the step of tempering the substrate in air after step (l).

13. A method according to claim 12, wherein the substrate is selected from one of single crystal and polycrystalline chalcopyrite semiconductor material.

14. A method according to claim 13, including using aqua regia for the etching of step (b) and deionized water for the rinsing of step (c) and (i).

15. A method according to claim 14, wherein the at least one repetition of etching of step (d) is achieved utilizing potassium cyanide.

16. A method according to claim 15, including using a redox electrolyte for step (e).

* * * * *

UNITED STATES PATENT OFFICE
CERTIFICATE OF CORRECTION

Patent No. 4,601,960          Dated July 22, 1986

Inventor(s)     Menezes et al

It is certified that error appears in the above-identified patent and that said Letters Patent are hereby corrected as shown below:

Title page:
The name of the Assignee should read as follows: Hahn Meitner-Institut Berlin GmbH.

Signed and Sealed this

Fifth Day of April, 1988

Attest:

DONALD J. QUIGG

*Attesting Officer*      *Commissioner of Patents and Trademarks*